(12) United States Patent
Huang et al.

(10) Patent No.: US 9,213,890 B2
(45) Date of Patent: *Dec. 15, 2015

(54) GESTURE RECOGNITION SYSTEM FOR TV CONTROL

(75) Inventors: Kuang-Man Huang, San Jose, CA (US); Ming-Chang Liu, San Jose, CA (US); Liangyin Yu, Fremont, CA (US)

(73) Assignee: SONY CORPORATION, Tokyo (JP)

(*) Notice: Subject to any disclaimer, the term of this patent is extended or adjusted under 35 U.S.C. 154(b) by 501 days.

This patent is subject to a terminal disclaimer.

(21) Appl. No.: 12/885,072

(22) Filed: Sep. 17, 2010

(65) Prior Publication Data

US 2012/0069168 A1 Mar. 22, 2012

(51) Int. Cl.

| | |
|---|---|
| H04N 7/18 | (2006.01) |
| G06F 3/033 | (2013.01) |
| G06K 9/00 | (2006.01) |
| G06F 3/048 | (2013.01) |
| G06F 3/01 | (2006.01) |
| G06K 9/44 | (2006.01) |
| G06K 9/46 | (2006.01) |
| G06F 3/03 | (2006.01) |
| H04N 21/4223 | (2011.01) |

(52) U.S. Cl.
CPC ............ *G06K 9/00355* (2013.01); *G06F 3/011* (2013.01); *G06F 3/017* (2013.01); *G06F 3/0304* (2013.01); *G06F 3/048* (2013.01); *G06K 9/00375* (2013.01); *G06K 9/44* (2013.01); *G06K 9/469* (2013.01); *H04N 21/4223* (2013.01)

(58) Field of Classification Search
CPC . G06K 9/00355; G06K 9/00375; G06K 9/44; G06K 9/469; G06F 3/017; G06F 3/011; G06F 3/0304; G06F 3/048; H04N 21/4223
See application file for complete search history.

(56) References Cited

U.S. PATENT DOCUMENTS

| | | | |
|---|---|---|---|
| 5,534,917 A | 7/1996 | MacDougall | |
| 5,594,469 A | 1/1997 | Freeman et al. | |
| 6,128,003 A | 10/2000 | Smith et al. | |
| 6,501,515 B1 * | 12/2002 | Iwamura | 348/734 |
| 6,738,041 B2 * | 5/2004 | Silber | 345/158 |
| 6,788,809 B1 * | 9/2004 | Grzeszczuk et al. | 382/154 |
| 7,046,232 B2 | 5/2006 | Inagaki et al. | |

(Continued)

FOREIGN PATENT DOCUMENTS

CN 101491498 A 4/2009

OTHER PUBLICATIONS

Stergiopoulou et al., "Hand Gesture Recognition Using a Neural Network Shape Fitting Technique," Engineering Applications of Artificial Intelligence, May 2009.*

(Continued)

*Primary Examiner* — Joseph Ustaris
*Assistant Examiner* — Jill Sechser
(74) *Attorney, Agent, or Firm* — John P. O'Banion (57) ABSTRACT

A gesture recognition system using a skin-color based method combined with motion information to achieve real-time segmentation. A Kalman filter is used to track the centroid of the hand. The palm center, palm bottom, as well as the largest distance from the palm center to the contour from extracted hand mask are computed. The computed distance to a threshold is then compared to decide if the current posture is "open" or "closed." In a preferred embodiment, the transition between the "open" and "closed" posture to decide if the current gesture is in "select" or "grab" state.

16 Claims, 10 Drawing Sheets

(56) References Cited

U.S. PATENT DOCUMENTS

| | | | |
|---|---|---|---|
| 2003/0194131 A1 | 10/2003 | Zhao et al. | |
| 2004/0193413 A1* | 9/2004 | Wilson et al. | 704/243 |
| 2008/0019589 A1 | 1/2008 | Yoon et al. | |
| 2008/0181459 A1 | 7/2008 | Martin et al. | |
| 2008/0244465 A1 | 10/2008 | Kongqiao et al. | |
| 2009/0110292 A1* | 4/2009 | Fujimura et al. | 382/203 |
| 2010/0060722 A1 | 3/2010 | Bell | |
| 2011/0267258 A1* | 11/2011 | Wang et al. | 345/156 |

OTHER PUBLICATIONS

United States Patent and Trademark Office (USPTO), International Search Report and Written Opinion issued Dec. 16, 2011 (with claims searched), related PCT Application No. PCT/US2011/045287, pp. 1-13.

Binh, N. et al.—"Real-time Hand Tracking and Gesture Recognition System"—GVIP 05 Conf., Dec. 19-21, 2005, Cairo, Egypt, 7 pages.

Yoon, H. et al.—"Hand gesture recognition using combined features of location, angle and velocity"—Abstract Only, Pattern Recognition, vol. 34, issue 7, 2001, pp. 1491-1501.

State Intellectual Property Office of the People's Republic of China, Notification of the First Office Action, appln. No. 201180043241.9, issued May 6, 2015, pp. 1-36, with claims examined, pp. 37-41, counterpart to this U.S. Appl. No. 12/885,072.

* cited by examiner

GESTURE RECOGNITION SYSTEM FOR TV CONTROL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to gesture recognition, and more particularly to gesture recognition for remote controls.

2. Description of Related Art

Gesture recognition is an emerging technology which can provide a more direct interaction method between human and machine. It is associated with spatial and temporal information and can be used to replace traditional control devices for future applications. Gesture recognition systems have been attempted, e.g. U.S. Pat. No. 5,534,917. However, these systems generally involve complicated analysis that are computationally intensive and/or require costly hardware.

Accordingly, an object of the present invention is a gesture recognition system that is able to take input from a typical HD camera and use a simple set of gestures to minimize computational power. At least some of these objections will be met in the following description.

BRIEF SUMMARY OF THE INVENTION

The present invention comprises system and methods that processes video of a moving hand as input and ouputs the current gesture state and hand position in each image. In each image, the hand area is segmented from the background and classifies as "open hand" or "close hand" based on one or more parameters. The system combines one or more of skin color model and motion to achieve real-time hand segmentation performance. Typical applications include, but are not limed to, gesture recognition for basic TV control, photo and web browsing on TV, and computers.

The present invention performs a real time and user friendly gesture recognition system for TV control with low computational complexity while using only a single HD camera.

The system uses a small sensor for gesture recognition and a TV, computer or other device may be controlled at distances up to and beyond 3 meters by simple hand gestures. A skin color model is combined with motion to separate the hand area from the background.

In operation, several parameters are extracted, such as the hand size, the palm center, and the hand bottom. Theses parameters are used to classify the current hand gesture as "open hand" or "close hand." The system then use the transition between different hand gesture states to control the device. The method beneficially only uses a single HD camera to take video sequence as input while being able to achieve real-time performance with low computational complexity.

The systems and methods of the present invention do not need any expensive and special sensors. Using both the skin color model and motion, the system can segment the hand area from the background without depth map. The gesture set of the present invention is user friendly (each to remember) and enough to cover essential functionalities for TV control.

The present invention realizes the gesture control for TV in a practical way and makes it possible for real TV features. In addition, there is no need for using two cameras or a 3-D camera with the system of the present invention.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 15. It will be appreciated that the apparatus may vary as to configuration and as to details of the parts, and that the method may vary as to the specific steps and sequence, without departing from the basic concepts as disclosed herein.

Figure 1:
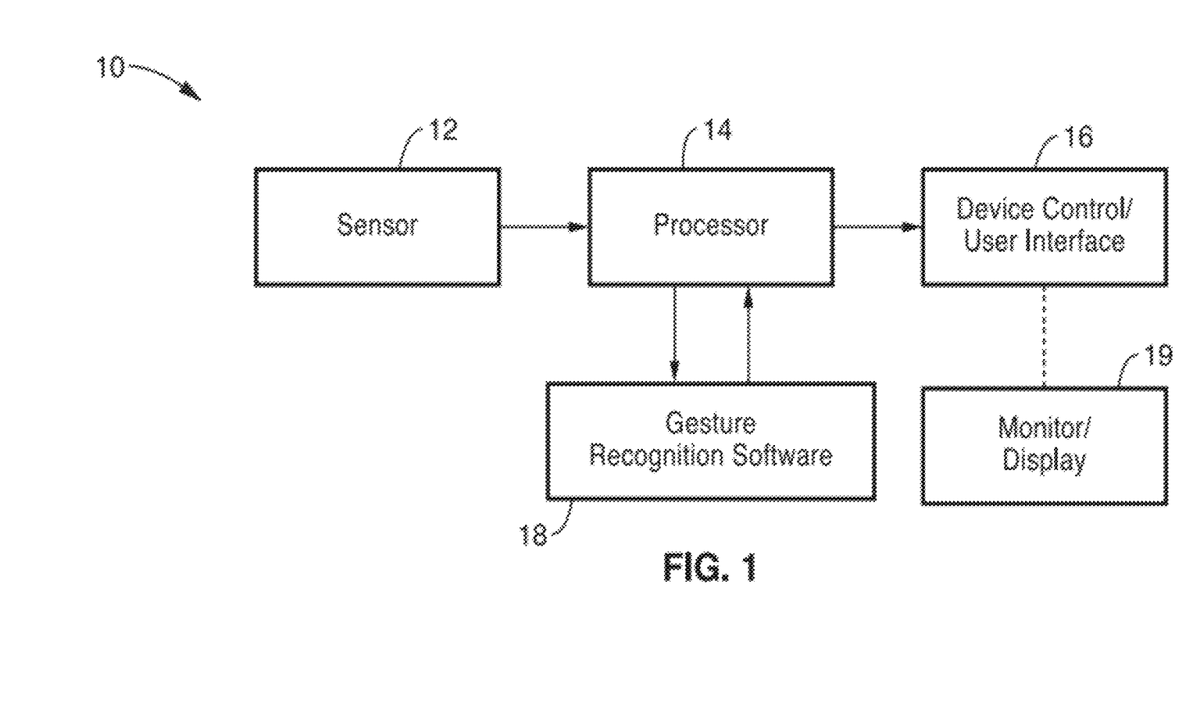
FIG. 1 is a schematic diagram of a gesture recognition system in accordance with the present invention.

FIG. 1 illustrates a schematic diagram of a gesture recognition system 10 of the present invention. The system 10 comprises a sensor 12 (e.g. HD format camera or the like), the output of which is coupled to processor 14 for receiving sensor input and operating gesture recognition software module 18. The gesture recognition module 18 analyzes the input from the sensor 12 and provides a command or operation that is sent to the device control application, or user interface software 16, which may be used to control volume, channel, programming, or other features of the device. It is appreciated that the device control application 16 may be configured to control a TV, set top box, computer, or other component.

Figure 2:
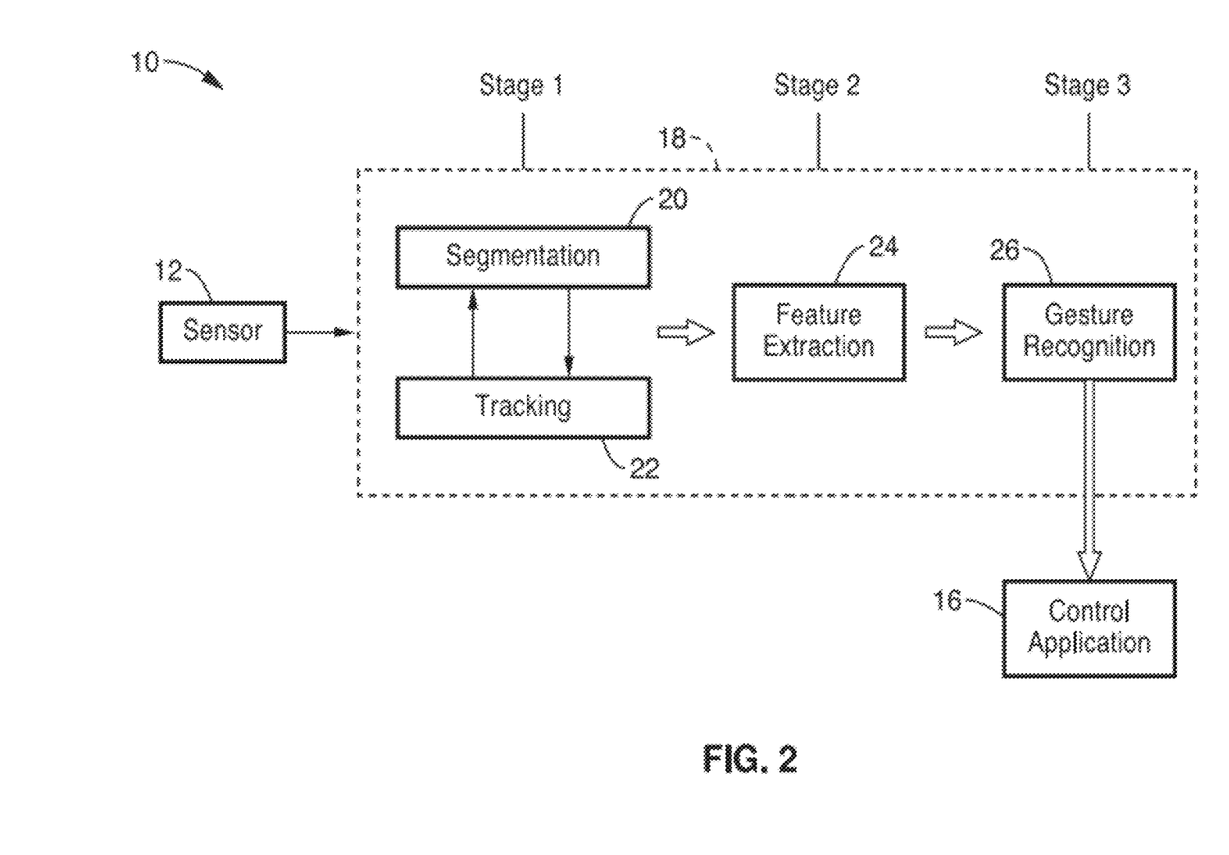
FIG. 2 illustrates a schematic diagram of the component overview of gesture recognition module of FIG. 1.

FIG. 2 illustrates the basic components of gesture recognition module 18 with respect to operation of system 10. The gesture recognition module 18 generally comprises three stages. In the first stage, the input or captured image from device 12 is processed at segmentation 20 and tracking 22 modules to segment the hand area from the background for tracking.

In the second stage, the system 10 performs a feature extraction module 24 to extract necessary features from detected hand areas.

In the third stage, the system 10 performs a gesture recognition module 18 by inputting the extracted features to a classifier for posture/gesture recognition 26. The result from gesture recognition module 18 is then output to the particular application 16 for control of the device.

Stage 1: Hand Segmentation

Image segmentation generally comprises assigning a label to the pixels in an image such that pixels with the same label share certain visual characteristics. The system 10 of the present invention preferably uses a skin color-based approach. This approach is based on the assumption that the skin tone is consistent (e.g. no significant change in values) within each individual image. This configuration separates chromatic components from intensity components to reduce sensitivity to light change. This approach allows for low computational complexity and real-time performance. In a preferred configuration, the input images from device 12 are in YCbCr 444 planar color format.

Figure 3:
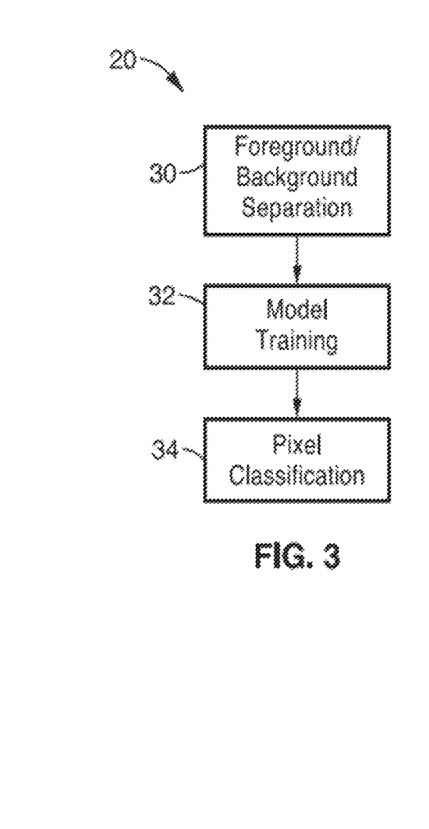
FIG. 3 is a schematic diagram of a segmentation module in accordance with the present invention.

As illustrated in FIG. 3, the segmentation module 20 generally comprises three steps: the first step 30 comprising foreground/background separation, the second step 32 comprising model training, and the third step 34 comprising pixel classification.

Figure 4:
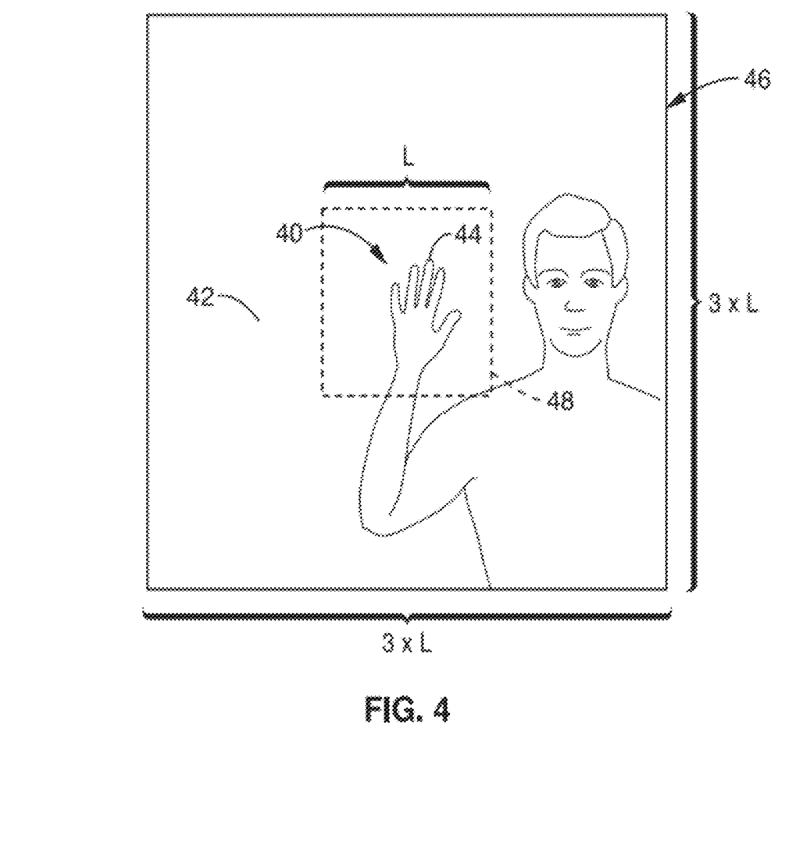
FIG. 4 is an illustration of a bounding box being applied to an image for foreground/background separation in accordance with the present invention.
Figure 5:
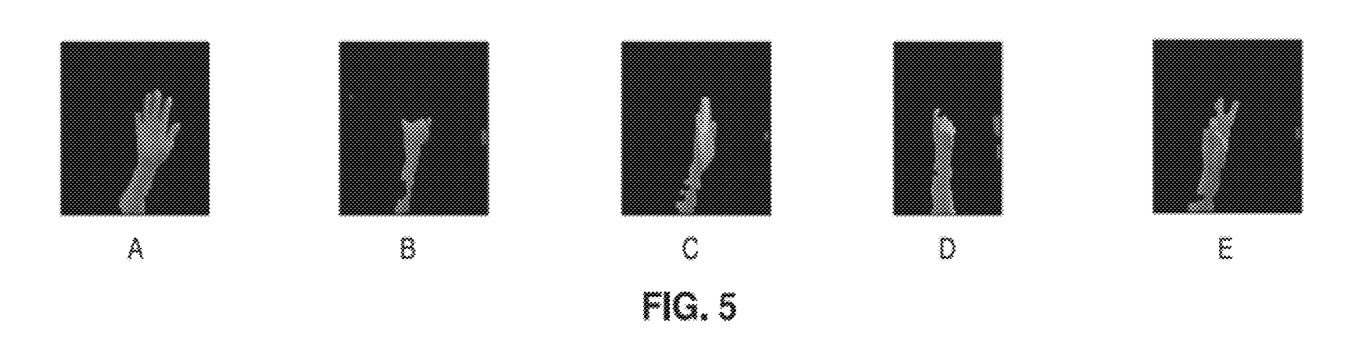
FIGS. 5A-5E illustrate images of successful hand segmentation results for different hand gestures according to the present invention.
Figure 6:
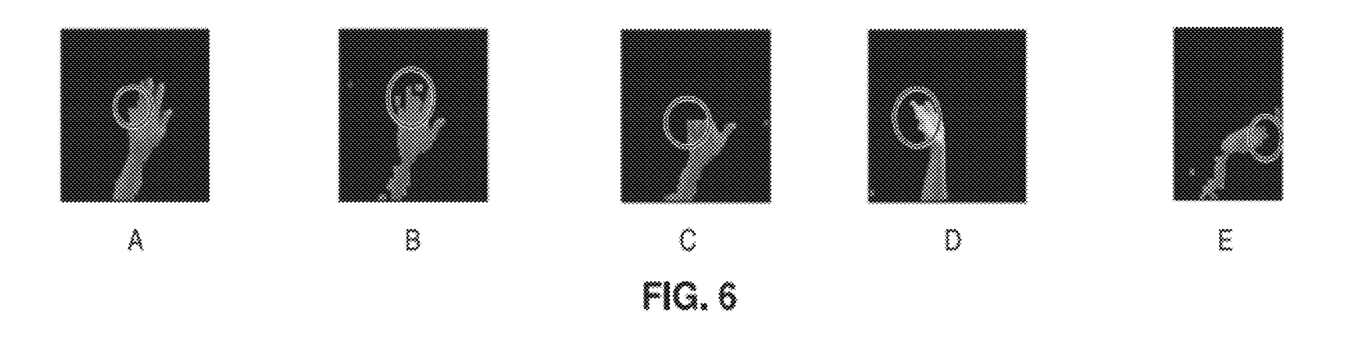
FIGS. 6A-E illustrate images of non-optimal hand segmentation.

FIG. 4 illustrates the foreground/background separation step 30, which detects the hand 44 position and size. A hand bounding box 48 is output after the hand 44 is detected. A triggering module (not shown) is preferably used to trigger the system 10 of the present invention to initiate (e.g. via the user raising hand 44). Bounding box 48 encloses the foreground area 40, and defines the background area 42 as the surrounding image enclosed in the outer box or search area 46. Here, the search area length is shown as 3× the bounding box 48 length L to cover movement of the hand 44. However, it is appreciated that other ratios may be applicable.

In the model training step 32, K-means clustering is preferably used to train a 3-component Gaussian mixture model for the image 40 inside the hand bounding box 48 (preferably only the Cb, Cr color channels are used). K-means is also used to train a 3-component Gaussian mixture model for the image within the background area 42 (only Cb, Cr color channels). Although it is possible to use other (e.g. histogram-based) methods K-means is preferred, as other methods are generally slower and more computationally intensive.

The K-means algorithm is an iterative technique that is used to partition the image into K clusters. The K-means algorithm generally comprises 1) picking K cluster centers, either randomly or based on some heuristic, 2) assigning each pixel in the image to the cluster that minimizes the distance between the pixel and the cluster center, 3) re-computing the cluster centers by averaging all of the pixels in the cluster, and 4) repeating steps 2 and 3 until convergence is attained (e.g. no pixels change clusters). Generally, the distance is the squared or absolute difference between a pixel and a cluster center. The difference may be based on pixel color, intensity, texture, and location, or a weighted combination of these factors.

The system 10 of the present invention preferably uses a skin color-based approach. This approach is based on the assumption that the skin tone is consistent (e.g. no significant change in values) within each individual image. This configuration is sensitive to light change and may be improved by separating chromatic components from intensity components. This approach allows for low computational complexity and real-time performance. In a preferred configuration, the input images from device 12 are in YCbCr 444 planar color format.

To refine the foreground 40 color model, all components which are not within the range of the general skin model ($77 \leq Cb \leq 127$, $133 \leq Cr \leq 173$) are eliminated.

If three components are all within (or all not within) the skin model range, we determine the component from the foreground Gaussian model which is the closest to any of the background components, and then eliminate it. The rest of the components are then used to represent the foreground area 40.

The pixel classification step 34 is preferably performed using GMM and Bayesian decision rule. For each current hand image, we use the same part of the previous image as the reference. Pixels satisfying either one of the following criteria (Equations 1 & 2 for motion, and Equation 3 for skin color) are considered as hand pixels (otherwise the pixels are classified as background pixels):

1. Motion and Skin-Color:

$$|Cb(x,y)-Cb_{ref}(x,y)|>5 \text{ or } |Cr(x,y)-Cr_{ref}(x,y)|>5 \qquad \text{Eq. 1}$$

and $$2*P_{hand} \times P(c|\text{hand}) > (1-P_{hand}) \times P(c|\text{background}) \qquad \text{Eq. 2}$$

2. Skin-Color:

$$P_{hand} \times P(c|\text{hand}) > (1-P_{hand}) \times P(c|\text{background}) \qquad \text{Eq. 3}$$

The pixel classification step 34 is preferably then followed by morphological dilating and eroding operators to refine the obtained binary hand mask.

The probabilities in pixel classification step 34 are computed using Equation 4, 5 and 6 as follows:

$$P(c \mid \text{hand}) = \sum_{k=1}^{K} p_k g_{hand}(c; \mu_k, \sigma_k) \quad \text{Eq. 4}$$

where $P_{hand}$ is the ratio of the previous hand area to the background area 42, P(c|hand) is the probability of a pixel c belonging to the foreground (hand) area 40, $g_{hand}$ is the probability of a pixel c belonging to the k-th component of the foreground Gaussian mixture model, and $p_k$ is the prior probability of the k-th component ($p_k$, the mean $\mu_k$, and the covariance matrix $\sigma_k$ are trained in model training step 32).

$$P(c \mid \text{background}) = \sum_{k=1}^{K} p_k g_{background}(c; \mu_k, \sigma_k) \quad \text{Eq. 5}$$

where P(c|background) is the probability of a pixel c belonging to the background area, $g_{background}$ is the probability of a pixel c belonging to the k-th component of the background Gaussian mixture model, and $p_k$ is the prior probability of the k-th component ($p_k$, the mean $\mu_k$, and the covariance matrix $\sigma_k$ are trained in model training step 32).

The probability of a pixel c belonging to a GMM component is computed using Equation 6:

$$g(c; \mu_k, \sigma_k) = \frac{1}{\left(\sqrt{2\pi}\, \sigma_k\right)^2} e^{-\frac{1}{2}\left(\frac{\|c - \mu_k\|}{\sigma_k}\right)^2} \quad \text{Eq. 6}$$

FIGS. 5A-5E illustrate successful hand segmentation results for different hand gestures according to the present invention. Correspondingly, the images in FIGS. 6A-E illustrate non-optimal hand segmentation wherein images of certain gestures have partial features, missing, incorrect, and/or discontinuous anatomy, as shown in the encircled areas.

The tracking step 22 tracks the palm center from the segmented image as the observation point. The palm center is obtained using an image-based method described in detail below.

The tracking step uses a Kalman filter for the prediction and computation of the actual hand position and speed for the next frame (based on the observation from the current frame).

An exemplary Kalman filter using low computation is shown in Equations 7 and 8:

$$X_k = F_k X_{k-1} + B_k U_k + W_k \quad \text{Eq. 7}$$

where $F_k$ is the state transition model which is applied to the previous state $X_{k-1}$, $B_k$ is the control-input model which is applied to the control vector $U_k$, $W_k$ is the process noise which is assumed to be drawn from a zero mean multivariate normal distribution with covariance $Q_k$.

$$Z_k = H_k X_k + V_k, V_k \sim N(o, R_k) \quad \text{Eq. 8}$$

where $H_k$ is the observation model which maps the true state space into the observed space and $V_k$ is the observation noise which is assumed to be zero mean Gaussian white noise with covariance $R_k$.

The hand position in each image (e.g. 2-D location of the palm center) is then output and saved as a part of the output structure.

Stage 2: Feature Extraction

Figure 7:
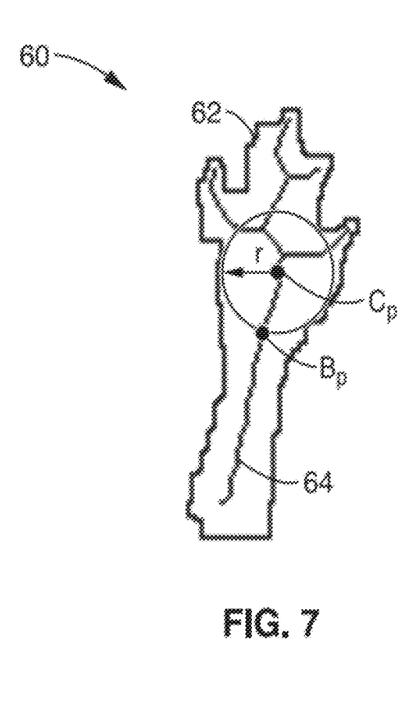
FIG. 7 illustrates a binary hand mask and calculated parameters for a segmented image frame in accordance with the present invention.
Figure 8:
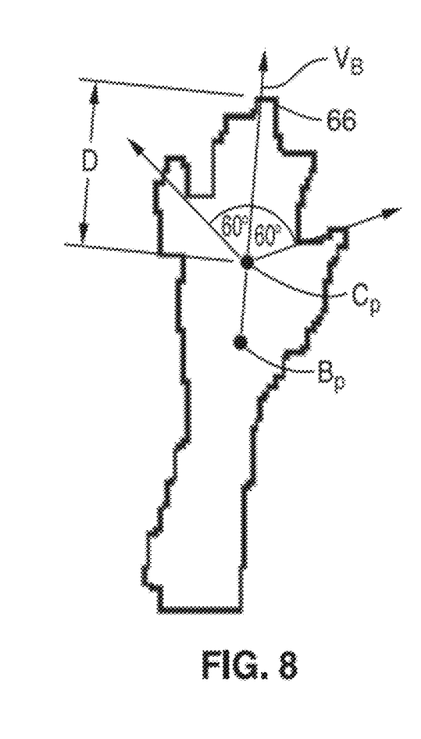
FIG. 8 illustrates a mask of FIG. 7 evaluated to find center-contour distance.

FIGS. 7-8 illustrate the second stage operations of the feature extraction module 24.

FIG. 7 illustrates a binary hand mask 60 for each segmented image frame. Hand mask 60 comprises the extracted contour 62 generated from the difference between the original mask and the eroded mask (not shown), and skeleton 64. The eroded mask is obtained by an eroding algorithm typically available in the art that thins the original mask by one pixel. The skeleton 64 is generated from a morphological thinning algorithm, which converts binary shapes obtained from the contour 62 to 1-pixel wide lines. The method may comprise any thinning algorithm generally known in the art, but generally involves iteratively deleting pixels inside the contour shape 62 to shrink it without shortening it or breaking it apart.

The extracted contour 62 is then analyzed with respect to the skeleton 64 to obtain the palm center $C_p$, which is defined and calculated as the point on the skeleton 64 that is at the largest distance r from the hand contour.

The palm bottom $B_p$ is then calculated as the point on skeleton 64 which is r pixels from (below) the palm center $C_p$.

After palm center $C_p$ and the palm bottom $B_p$ point are determined for each hand mask 60, the direction vector $V_B$ is calculated as a line passing through the two points from palm center $C_p$ and the palm bottom $B_p$.

The contour point 66 (generally the middle finger tip) with the largest distance D from the palm center $C_p$ (or alternatively the palm bottom $B_p$) within the range of ±60° of direction vector $V_B$ is then calculated. The range of ±60° is generally used based on average anatomy. However, this range may be varied accordingly.

Stage 3: Gesture Recognition

For the gesture recognition module 26, each hand image is then classified as "open" or "closed" by comparing the distance D to a threshold value T. The threshold T is obtained via a calibration step, wherein the first five "open hand" images are segmented and values of distance D and palm radius r are obtained. The threshold is then calculated using the average AVE(D+1.5r)/2.

In each video, a sliding window having a 5-frame size is to recognize "Open" or "Closed" gestures.

"Open": if there are 3 or more open postures within the most current 5 frames, then the current posture is considered to be "Open."

"Closed": if there are 3 or more closed postures within the most current 5 frames, then the current posture is considered to be "Closed."

Figure 9:
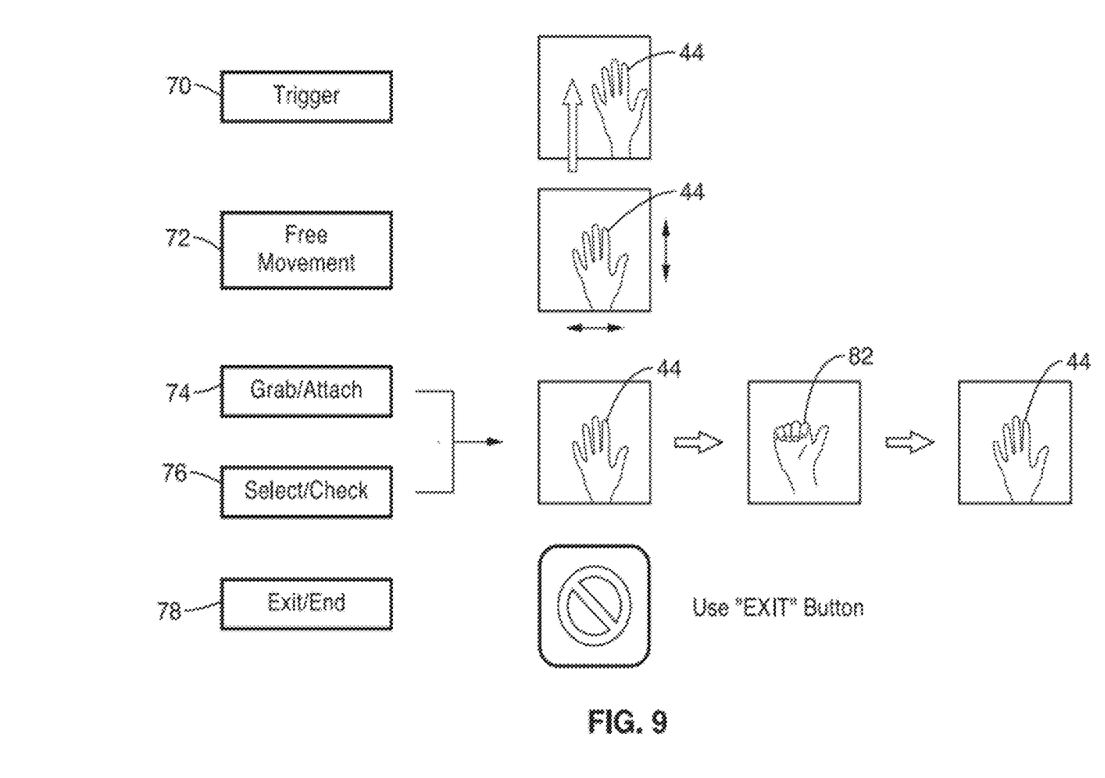
FIG. 9 illustrates an exemplary gesture set for TV control in accordance with the present invention.

FIG. 9 illustrates some key functionalities of the gesture recognition module 26 of the present invention. The transition between the "Open" and "Closed" postures may be used to indicate when the gesture "Select" or "Grab" is triggered.

For example, to trigger the gesture recognition system to initialize, a hand 44 may be raised in a region within the field of view of the sensor 12, and kept with an open-hand posture for 1 to 2 second, as shown in step 70.

Once the system is initialized, the open hand may be used to control a cursor via tracking free hand movement (e.g. the palm center) in step 72 (the cursor may be visible on the monitor screen of the TV or device being operated (e.g. set top box or the like)).

Figure 10:
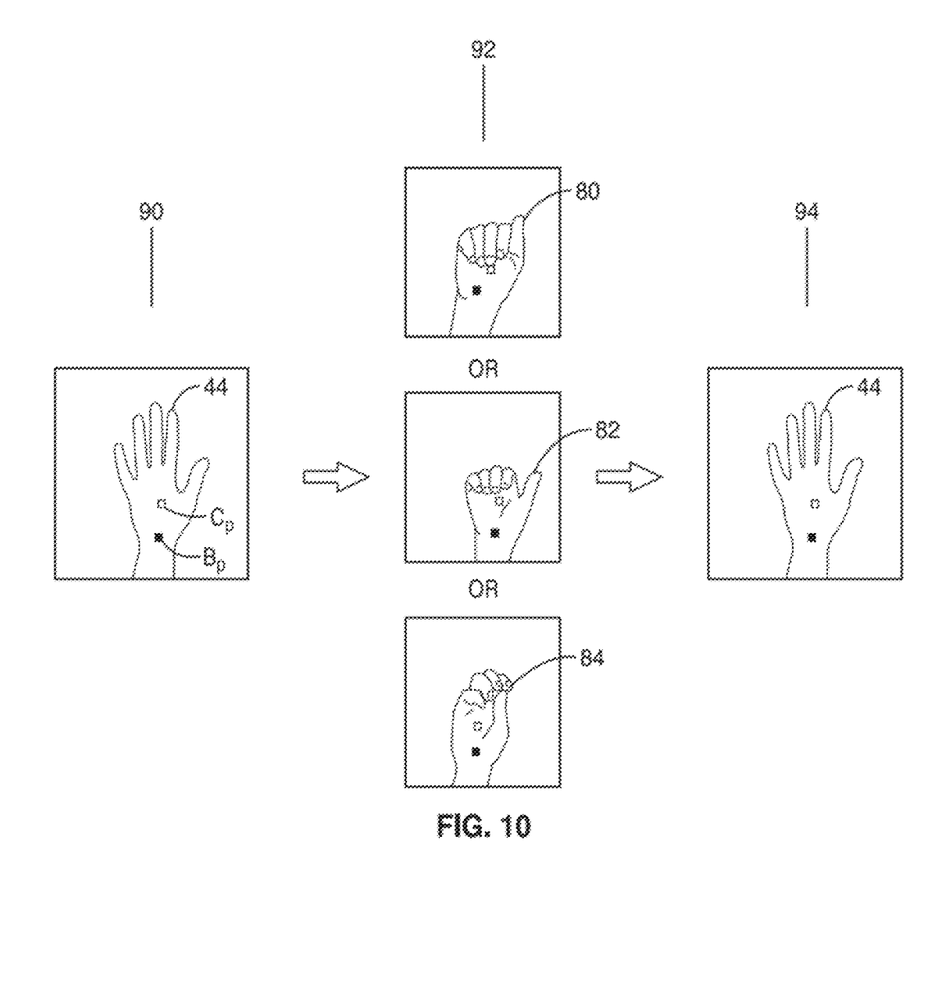
FIG. 10 illustrates a sequence gesture set that may be used for particular operations in accordance with the present invention.

Special commands, e.g. grab/attach operation 74 or select/check operation 76, may be performed using a combination of gestures and distinct timing. FIG. 10 illustrates a sequence that may be used for either the grab/attach operation 74 or select/check operation 76. The first step 90 comprises an open hand gesture 44, which may direct the cursor to the desired location (e.g. position on user interface screen) to check or select. The second step 92 may be initiated by either a closed first gesture 80, fingers forward gesture 82 or fingers clinched gesture 84 to select or check the desired feature. Once selected, the open palm gesture 44 in the third step 94 returns the free movement of the cursor.

The grab/attach operation 74 is performed similarly, however, the user would hold one of the gestures 80, 82, or 84 in step 2 and wait for the item to attach.

Referring now to FIGS. 11-15, the system 10 of the present invention preferably comprises hand-face occlusion programming to deal with the situation when the hand 44 is crossing or very close to the face 102.

The occlusion situation is generally restricted by the following assumptions: 1) The hand has much bigger movement than the face, 2) there are no other skin-color blobs close to the face, there is no change of gesture during the occlusion, 3) during the occlusion, the hand has no big movement in the y-direction.

Figure 11:
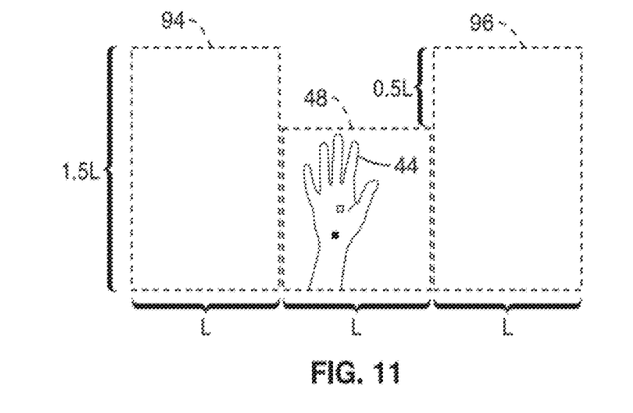
FIG. 11 shows neighboring bounding boxes applied to a hand bounding box of an image.

As shown in FIG. 11, for each current hand bounding box 48, neighboring areas on left and right sides of box 48 are generated using two rectangles 94 and 96. Each rectangle 94 and 96 has a height of 1.5L, and width of L, where L is the bounding box 48 length. The bottom of boxes 48, 94 and 96 are aligned such that the left and right neighboring boxes 94 and 96 extend ½L above box 48.

All pixels in neighboring areas 94, 96 are classified as skin or non-skin pixels (using the previously trained Gaussian mixture model). The number of skin pixels in each square area is then counted. If the number is greater than a threshold (e.g. ⅔ of the open hand computed in calibration step), the square is considered to be containing an object that may cause occlusion.

Figure 12:
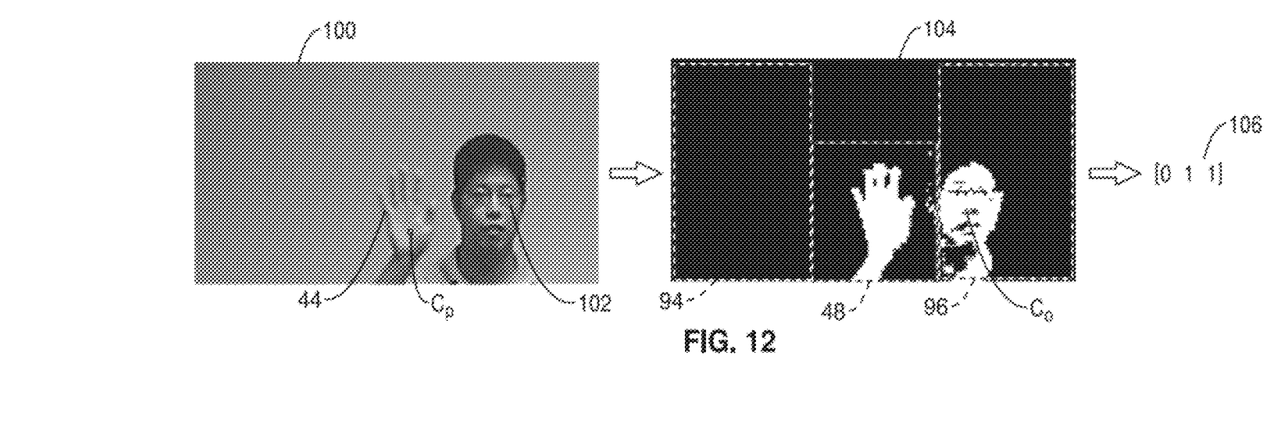
FIG. 12 shows a hand image transferred to an indicator matrix based on the results of the segmented model.

As shown in FIG. 12, each hand image 100 is transferred to an indicator matrix 106 based on the results of the segmented model 104. A "1" is assigned for a box containing an object, otherwise a "0" is assigned. As depicted in FIG. 12, left neighboring box 94 does not meet the threshold skin pixels, and is assigned a "0", whereas hand bounding box 48 and right neighboring box 96 do meet the threshold pixel count, and are assigned a "1".

Next, the centroid of the object $C_o$ is computed and recorded. Each pair of adjacent indicator matrices (along time axis) is examined. Any position having transition of 1→0, indicates one of the following: 1) a nearby object (face 102) has merged into the hand 44, or 2) the hand 44 is moving away from an object (e.g. face 102).

The distance of the current position of the hand and the previously recorded object centroid $C_o$ are measured to decide if the hand 44 is touching it or moving away from it (occlusion occurs, for example, if the distance is smaller than a specified fraction (e.g. 60-75%) of bounding box length L).

Figure 13:
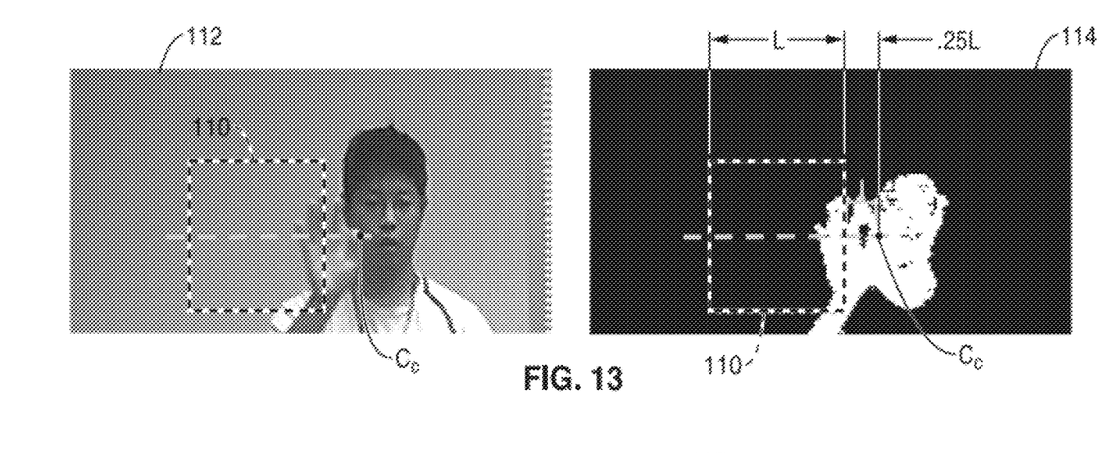
FIG. 13 illustrates an image of an occlusion occurrence and respective segmentation model.

FIG. 13 illustrates an image 112 of an occlusion occurrence and respective segmentation model 114. If occlusion occurs, a standby area 110 is defined close to the position of the current centroid $C_c$ (with the same y as centroid). The size of the standby area 110 is the same as the hand bounding box 48, e.g. length L.

Figure 14:
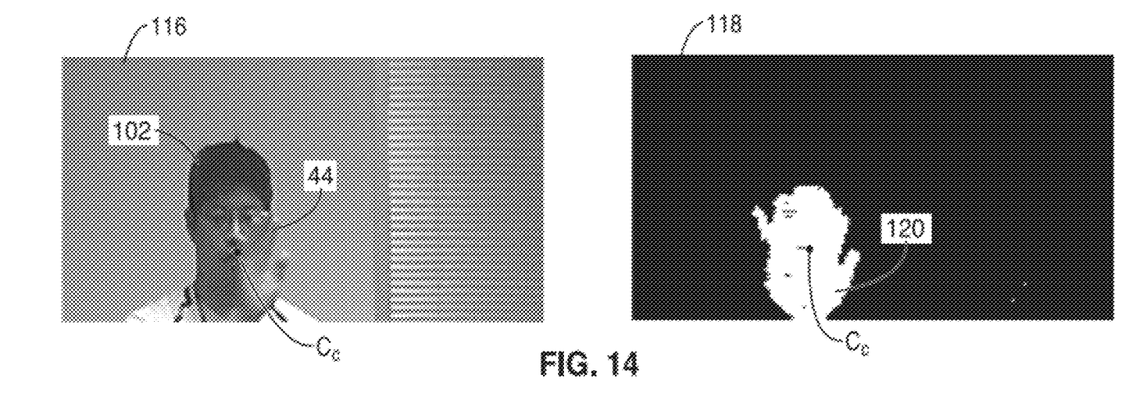
FIG. 14 illustrates another image of an occlusion occurrence and respective segmentation model.

FIG. 14 illustrates another image 116 of an occlusion occurrence and respective segmentation model 118. During the occlusion, the centroid $C_c$ of the overall binary mask 120 (hand 44 plus face 102) is used as the predicted position.

Figure 15:
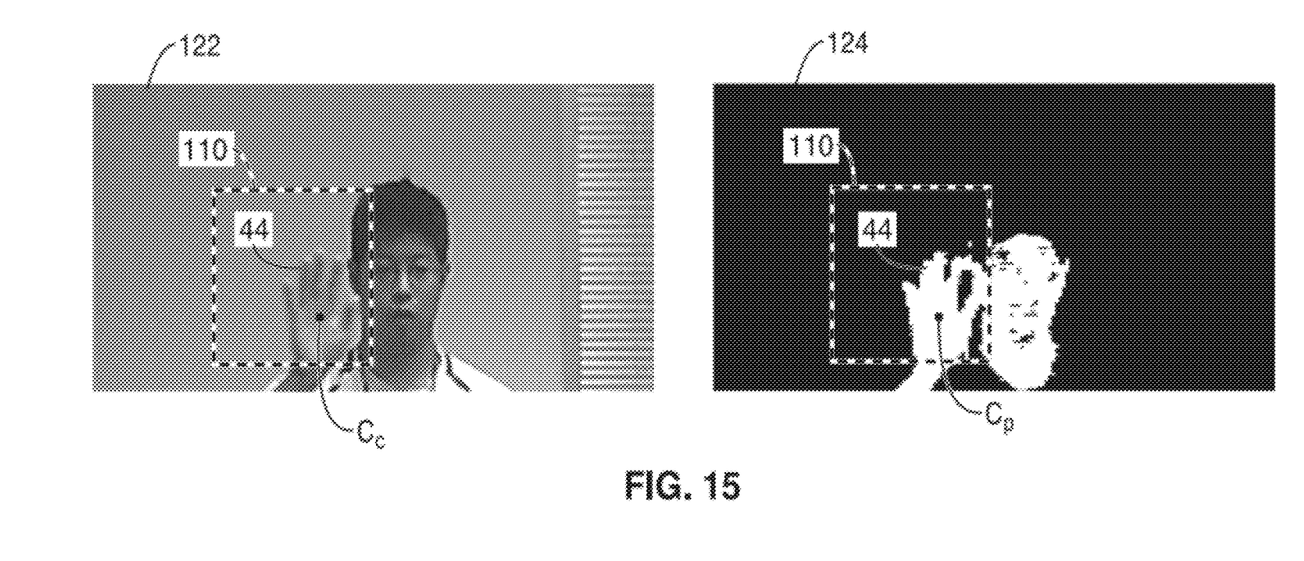
FIG. 15 illustrates an image and segmentation model of a hand coming out of the occlusion.

FIG. 15 illustrates image 122 and segmentation model 124 of the hand 44 coming out of the occlusion (e.g. an object is detected in the standby area 110). The centroid $C_c$ of the object is then used as the current hand position and motion tracking is resumed.

In summary, the system 10 and methods of the present invention apply a skin-color based method combined with motion information to achieve real-time segmentation. A Kalman filter is used to track the centroid of the hand. The palm center, palm bottom, as well as the largest distance from the palm center to the contour from extracted hand mask are computed. The computed distance to a threshold is then compared to decide if the current posture is "open" or "closed." In a preferred embodiment, the transition between the "open" and "closed" posture to decide if the current gesture is in "select" or "grab" state.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A gesture recognition system for remote control of a device, comprising: a sensor for capturing video data of a user's hand at a location near said device; a processor for processing the captured video data of said hand; programming executable on said processor for carrying out the steps of: segmenting each hand image in the captured video based on skin color; extracting one or more parameters of the segmented hand image; tracking the at least one of the one or more parameters in the hand image; classifying a hand gesture as "open" or "closed" based on said one or more parameters; and operating the device based on recognition of said hand gesture and tracking of said one or more parameters.

2. A system as recited in embodiment 1, wherein segmenting each hand image comprises: separating a foreground area associated with said hand from a background area surround said foreground area. training a 3-component mixture model of the background area and foreground area; and classifying the image pixels based on one or more of motion and skin color.

3. A system as recited in embodiment 1, wherein the image is segmented using only Cb and Cr color channels.

4. A system as recited in embodiment 1, wherein extracting one or more parameters comprises: obtaining a palm center location of the user's hand based on an extracted contour and skeleton of the hand.

5. A system as recited in embodiment 4, wherein tracking the one or more parameters comprises tracking the palm center location using a Kalman filter.

6. A system as recited in embodiment 4, wherein extracting one or more parameters further comprises: obtaining a palm bottom location; and measuring the distance between the palm center location and a furthest contour point on the extracted image contour; the furthest contour point being within a predetermined angular range of a vector passing through the palm bottom location and the palm center location.

7. A system as recited in embodiment 6, wherein classifying a hand gesture as "open" or "closed" comprises: comparing the distance to the furthest contour point to a threshold value; classifying the image as "open" if the distance to the furthest contour point is above the threshold value; and classifying the image as "closed" if the distance to the furthest contour point is below the threshold value.

8. A system as recited in embodiment 1, wherein the device comprises a user interface coupled to a display, the user interface being output on said display; wherein operating the device comprises sending a command to the user interface based on recognition of said hand gesture and tracking of said one or more parameters.

9. A system as recited in embodiment 8, wherein a transition between an "open" hand gesture and a "closed" hand gesture is used to determine whether "select" or "grab" command is sent to the user interface.

10. A system as recited in embodiment 9, wherein tracking of an open hand gesture is use to determine a location of a cursor on the user interface.

11. A gesture recognition system for remote control of a device having a user interface for visualization on a display, comprising: a sensor for capturing video data of a user's hand at a location near the device; a processor for processing the captured video data of the hand; programming executable on said processor for carrying out the steps of: segmenting each hand image in the captured video based on skin color; extracting one or more parameters of the segmented hand image; tracking the one or more parameters in the hand image; classifying a hand gesture as "open" or "closed" based on said one or more parameters; and operating the device based on recognition of said hand gesture and tracking of said one or more parameters; wherein operating the device comprises sending a command to the user interface based on recognition of said hand gesture and tracking the position of said one or more parameters.

12. A system as recited in embodiment 11, wherein segmenting each hand image comprises: separating a foreground area associated with said hand from a background area surrounding said foreground area, training a 3-component mixture model comprising only Cb and Cr color channels of the background area and foreground area; and classifying the image pixels based on one or more of motion and skin color.

13. A system as recited in embodiment 11, wherein extracting one or more parameters comprises: obtaining a palm center location of the user's hand based on an extracted contour and skeleton of the hand; obtaining a palm bottom location of the hand based on the palm center location; and measuring the distance between the palm center location and a furthest contour point on the extracted image contour; the furthest contour point being within an angular range of a vector passing through the palm bottom location and the palm center location.

14. A system as recited in embodiment 13, wherein tracking the one or more parameters comprises tracking the palm center location using a Kalman filter.

15. A system as recited in embodiment 13, wherein classifying a hand gesture as "open" or "closed" comprises: comparing the distance to the furthest contour point to a threshold value; classifying the image as "open" if the distance to the furthest contour point is above the threshold value; and classifying the image as "closed" if the distance to the furthest contour point is below the threshold value.

16. A system as recited in embodiment 15, wherein a transition between an "open" hand gesture and a "closed" hand gesture is used to determine whether a "select" or "grab" command is sent to the user interface.

17. A system as recited in embodiment 16, wherein tracking of an open hand gesture is use to determine a location of a cursor on the user interface.

18. A method for remotely controlling a device using hand gestures, the device having a user interface for visualization on a display, comprising: capturing video of a user's hand with a sensor at a location near said device; segmenting each hand image in the captured video based on skin color; extracting one or more parameters of the segmented hand image; tracking the at least one of the one or more parameters in the hand image; classifying a hand gesture as "open" or "closed" based on said one or more parameters; operating the device based on recognition of said hand gesture and tracking of said one or more parameters; sending a command to the user interface based on recognition of said hand gesture and tracking of said one or more parameters; and outputting the sent command on the display to operate the device.

19. A method as recited in embodiment 18: wherein extracting one or more parameters comprises: obtaining a palm center location of the user's hand based on an extracted contour and skeleton of the hand; obtaining a palm bottom location of the hand based on the palm center location; and measuring the distance between the palm center location and a furthest contour point on the extracted image contour; the furthest contour point being within an angular range of a vector passing through the palm bottom location and the palm center location, and wherein classifying a hand gesture as "open" or "closed" comprises: comparing the distance to the furthest contour point to a threshold value; and classifying the image as "open" if the distance to the furthest contour point is above the threshold value; and classifying the image as "closed" if the distance to the furthest contour point is below the threshold value.

20. A method as recited in embodiment 19: wherein a transition between an "open" hand gesture and a "closed" hand gesture is used to determine whether a "select" or "grab" command is sent to the user interface; and wherein tracking the palm center of an open hand gesture is use to determine a location of a cursor on the user interface.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A gesture recognition system for remote control of a device, comprising:
    (a) a sensor for capturing video data of a user's hand at a location near the device;
    (b) a processor for processing the captured video data of the hand; and
    (c) programming executable on said processor for carrying out steps comprising:
        segmenting each hand image in the captured video based on skin color;
        extracting one or more parameters of the segmented hand image;
        wherein the one or more parameters comprises a palm center location of the user's hand based on an extracted contour and skeleton of the hand;
        wherein said palm center location comprises a center of the user's palm during an "open" configuration of the user's hand;
        said "open" configuration corresponding to a condition wherein all of the user's fingers are extended to expose the user's palm;
        wherein the one or more parameters further comprises a palm bottom location;
        measuring the distance between the palm center location and a furthest contour point on the extracted image contour;
        the furthest contour point being within a predetermined angular range of a vector passing through the palm bottom location and the palm center location;
        tracking the one or more parameters in the hand image;
        classifying a hand gesture as "open" or "closed" based on the one or more parameters; and
        operating the device based on recognition of said hand gesture and tracking the position of said one or more parameters.

2. A system as recited in claim 1, wherein segmenting each hand image comprises:
    separating a foreground area associated with said hand from a background area surrounding said foreground area;
    training a 3-component mixture model of the background area and foreground area; and
    classifying the image pixels based on one or more of motion and skin color.

3. A system as recited in claim 1, wherein the image is segmented using only Cb and Cr color channels.

4. A system as recited in claim 1, wherein tracking the one or more parameters comprises tracking the palm center location using a Kalman filter.

5. A system as recited in claim 1, wherein classifying a hand gesture as "open" or "closed" comprises:
    comparing the distance to the furthest contour point to a threshold value;
    classifying the image as "open" if the distance to the furthest contour point is above the threshold value; and
    classifying the image as "closed" if the distance to the furthest contour point is below the threshold value.

6. A system as recited in claim 1:
    wherein the device comprises a user interface coupled to a display, the user interface being output on said display; and
    wherein operating the device comprises sending a command to the user interface based on recognition of said hand gesture and tracking of said one or more parameters.

7. A system as recited in claim 6, wherein a transition between an "open" hand gesture and a "closed" hand gesture is used to determine whether "select" or "grab" command is sent to the user interface.

8. A system as recited in claim 7, wherein tracking of an open hand gesture is use to determine a location of a cursor on the user interface.

9. A gesture recognition system for remote control of a device having a user interface for visualization on a display, comprising:
    (a) a sensor for capturing video data of a user's hand at a location near the device;
    (b) a processor for processing the captured video data of the hand;
    (c) programming executable on said processor for carrying out steps comprising:
        segmenting each hand image in the captured video based on skin color;
        extracting one or more parameters of the segmented hand image;
        wherein the one or more parameters comprises a palm center location of the user's hand based on an extracted contour and skeleton of the hand;
        wherein said palm center location comprises a center of the user's palm during an "open" configuration of the user's hand;
        said "open" configuration corresponding to a condition wherein all of the user's fingers are extended to expose the user's palm;
        wherein the one or more parameters further comprises a palm bottom location;
        measuring the distance between the palm center location and a furthest contour point on the extracted image contour;
        the furthest contour point being within a predetermined angular range of a vector passing through the palm bottom location and the palm center location;
        tracking the one or more parameters in the hand image;
        classifying a hand gesture as "open" or "closed" based on said one or more parameters; and
        operating the device based on recognition of said hand gesture and tracking of said one or more parameters;

wherein operating the device comprises sending a command to the user interface based on recognition of said hand gesture and tracking the position of said one or more parameters.

10. A system as recited in claim 9, wherein segmenting each hand image comprises:
separating a foreground area associated with said hand from a background area surrounding said foreground area;
training a 3-component mixture model comprising only Cb and Cr color channels of the background area and foreground area; and
classifying the image pixels based on one or more of motion and skin color.

11. A system as recited in claim 9, wherein tracking the one or more parameters comprises tracking the palm center location using a Kalman filter.

12. A system as recited in claim 9, wherein classifying a hand gesture as "open" or "closed" comprises:
comparing the distance to the furthest contour point to a threshold value;
classifying the image as "open" if the distance to the furthest contour point is above the threshold value; and
classifying the image as "closed" if the distance to the furthest contour point is below the threshold value.

13. A system as recited in claim 12, wherein a transition between an "open" hand gesture and a "closed" hand gesture is used to determine whether a "select" or "grab" command is sent to the user interface.

14. A system as recited in claim 13, wherein tracking of an open hand gesture is use to determine a location of a cursor on the user interface.

15. A method for remotely controlling a device using hand gestures, the device having a user interface for visualization on a display, the method comprising:
capturing video of a user's hand with a sensor at a location near said device;
segmenting each hand image in the captured video based on skin color;
extracting one or more parameters of the segmented hand image;
wherein the one or more parameters comprises a palm center location of the user's hand based on an extracted contour and skeleton of the hand;
wherein said palm center location comprises a center of the user's palm during an "open" configuration of the user's hand;
said "open" configuration corresponding to a condition wherein all of the user's fingers are extended to expose the user's palm;
wherein the one or more parameters further comprises a palm bottom location;
measuring the distance between the palm center location and a furthest contour point on the extracted image contour;
the furthest contour point being within a predetermined angular range of a vector passing through the palm bottom location and the palm center location;
tracking the at least one of the one or more parameters in the hand image;
classifying a hand gesture as "open" or "closed" based on said one or more parameters;
wherein classifying a hand gesture as "open" or "closed" comprises:
comparing the distance to the furthest contour point to a threshold value; and
classifying the image as "open" if the distance to the furthest contour point is above the threshold value; and
classifying the image as "closed" if the distance to the furthest contour point is below the threshold value;
operating the device based on recognition of said hand gesture and tracking of said one or more parameters;
sending a command to the user interface based on recognition of said hand gesture and tracking of said one or more parameters; and
outputting the sent command on the display to operate the device.

16. A method as recited in claim 15:
wherein a transition between an "open" hand gesture and a "closed" hand gesture is used to determine whether a "select" or "grab" command is sent to the user interface; and
wherein tracking the palm center of an open hand gesture is use to determine a location of a cursor on the user interface.

* * * * *